United States Patent [19]

Matsugo

[11] 4,204,764
[45] May 27, 1980

[54] NOISE REJECTING COMPENSATION CIRCUIT FOR DEVELOPING APPARATUS

[75] Inventor: Ryuzo Matsugo, Mitaka, Japan

[73] Assignee: Sumiyoshi Denki Kabushiki Kaisha, Tokyo, Japan

[21] Appl. No.: 23,180

[22] Filed: Mar. 23, 1979

[30] Foreign Application Priority Data

Mar. 28, 1978 [JP] Japan .................... 53-35749

[51] Int. Cl.² .............................. G03D 13/00
[52] U.S. Cl. .................... 354/298; 354/324; 137/93; 356/444
[58] Field of Search .............. 354/298, 324; 137/93; 356/443, 444; 250/559

[56] References Cited

U.S. PATENT DOCUMENTS

| | | | |
|---|---|---|---|
| 3,559,555 | 2/1971 | Street | 354/298 |
| 3,561,344 | 2/1971 | Frutiger | 354/298 |
| 3,763,758 | 10/1973 | Manack et al. | 354/298 |
| 3,787,689 | 1/1974 | Fidelman | 354/298 X |
| 3,870,065 | 3/1975 | Minns, Jr. | 137/93 |
| 3,927,417 | 12/1975 | Kinoshita et al. | 354/298 |
| 4,057,818 | 11/1977 | Gaskill et al. | 354/298 |

*Primary Examiner*—L. T. Hix
*Assistant Examiner*—William B. Perkey
*Attorney, Agent, or Firm*—Fred Philpitt

[57] ABSTRACT

In a noise rejecting compensation circuit for developing apparatus to be replenished with developing liquid during a time when the integral value derived from summing up an electric signal through integrator means by predetermined periods reaches a predetermined value from another value, said electric signal is transformed through photocell means from a light emitted from light source means and interfered with film means, differential amplifier means is provided at the input side of said integrator means, leakage by-pass having condenser means is connected with said differential amplifier means in parallel, and leakage contact means is provided to be closed at a time when said light source means is turned off in said leakage by-pass means.

4 Claims, 4 Drawing Figures

NOISE REJECTING COMPENSATION CIRCUIT FOR DEVELOPING APPARATUS

BACKGROUND OF THE INVENTION

The present invention relates to a noise rejecting compensation circuit for developing apparatus. This apparatus is replenished with developing liquid during a time when the integral value derived from summing up an electric signal through integrator means by predetermined periods reaches a predetermined value from another value. The above-mentioned electric signal is transformed through photocell means from a light emitted from light source means and interfered with film means. In the subject circuit of the present invention, differential amplifier means is provided at the input side of the integrator means, leakage by-pass having condenser means is connected with the differential amplifier means in parallel, and leakage contact means closed at a time when the light source means is turned off is inserted in the leakage by-pass means.

DESCRIPTION OF THE PRIOR ART

In developing apparatus it has been customary to replenish the apparatus with developing liquid according to the liquid-fatigue which is known through detecting the integral value summing up the blackness area of film by predetermined periods. In general, the blackness area of film is detected through a light interfered with film and thereafter transformed with a photocell into an electric signal.

However, prior to the present invention, in this apparatus, some output often appears even if the light source for lighting the film is turned off. Such output originates from the temperature-characteristic of photocell and the characteristics of amplifier.

When such output appears, it is summed up as an error value through the following integrator. Therefore, in case the blackness of film is detected under the light, such error value is always mixed with the normal integral value corresponding to the film blackness. Such mixing of error value will affect the precise detection of the film blackness.

SUMMARY OF THE INVENTION

In view of the foregoing state of the art, it is an object of the present invention to provide a noise rejecting compensation circuit for developing apparatus in order to eliminate the previous fault by rejecting the integrator input at a time when the film is not lighted.

DESCRIPTION OF THE PREFERRED EMBODIMENTS

Figure 1:
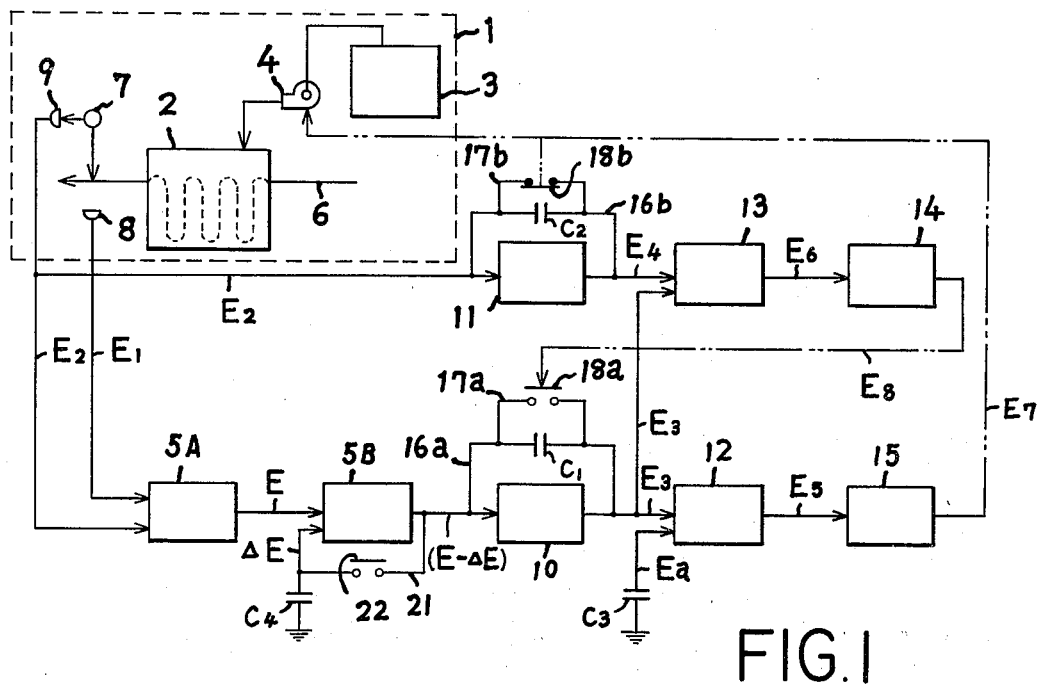
FIG. 1 is a block diagram of an embodiment of the present invention.

Referring now to the drawings for a detailed description of the present invention wherein like reference numerals identify like parts.

As shown in FIG. 1, a film undeveloped is fed at a constant speed and automatically developed in an automatic developing machine (1). The developing machine (1) is provided with a developing tank (2) and a developing liquid reservior (3). Liquid reservoir (3) supplies the developing tank (2) with developing liquid by means of a pump (4) in accordance with the proceeding of developing treatment of the film, i.e., with the degree of fatigue of the developing liquid.

The film (6) developed in the tank (2) is lighted by means of a light source (7), and a light interfered with the film (6), i.e., a light penetrated or reflected the film is received through a photocell (8) and thereby transformed into an electric signal (E1) which is corresponding to the blackness area of the film.

Electric signal (E1) is set to the zero output value when the blackness area of the film is 100% and also set to the maximum output value (E1 max) when the blackness area of the film is 0%. In the intermediate blackness area of the film, signal (E1) is linearly proportional to the blackness area of the film.

An electric signal (E2) is issued from a second photocell (9) which detects the brightness variations of the light source. The signal (E2) is set to be equal to signal (E1 max) which appears at a time when the blackness area of the film is 0%, i.e., in case there is no film or the film is transparent.

Output (E1) of photocell (8) is applied to a differential amplifier (5A), and output (E2) of photocell (9) is applied to a second integrator (11) and the above differential amplifier (5A). In second integrator (11), the equation: $\int E2 \cdot dt$ is calculated. In differential amplifier (5A), the equation: (E2−E1) is calculated and thereby the amplified output (E) is applied to a first integrator (10) through differential amplifier (5B).

First and second integrator (10) and (11) are provided with by-passes (16a) and (16b), respectively. By-passes (16a) and (16b) have condensers (C1) and (C2), respectively. These condensers (C1) and (C2) are connected with by-passes (17a) and (17b) in parallel, respectively. By-passes (17a) and (17b) are provided with a contact (18a) normally opened and a contact (18b) normally closed, respectively.

An output (E3) of integrator (10) is applied to a first comparator (12) for starting a replenishing operation and to a second comparator (13) for stopping the same.

To such comparator (12) a reference voltage (Ea) for starting the replenishing operation has been applied (C3 designates a condenser for reference voltage). When signal (E3) of the first integrator reaches reference voltage (Ea), an output signal (E5) of the first comparator appears and thereby a driving circuit (15) is driven. Pump (4) is driven by a signal (E7) issued from driving circuit (15) and thereby developing liquid contatined in reservoir (3) is supplied to developing tank (2). Also, the signal (E7) turns off contact (18b) of the second integrator (11) and thereby the second integrator (11) starts its integration. The resulting integral signal (E4) is then applied to the second comparator (13).

When signal (E4) of the second integrator reaches signal (E3) of the first integrator, an output signal (E6) is issued from the second comparator (13) and thereby a monomulti-circuit (14) is activated to issue a reset shot-pulse (E8). Contact (18a) of the first integrator is closed by this pulse (E8) and thereby integral signal (E3) is cleared. When signal (E3) is cleared, output signal (E5) issued from the first comparator (12) falls to zero. Also, this causes output signal (E7) of driving circuit to set zero and thereby pump (4) stops its replenishing operation. At this time, signal (E4) is also cleared by closing contact (18b) of the second integrator (11).

Figure 4:
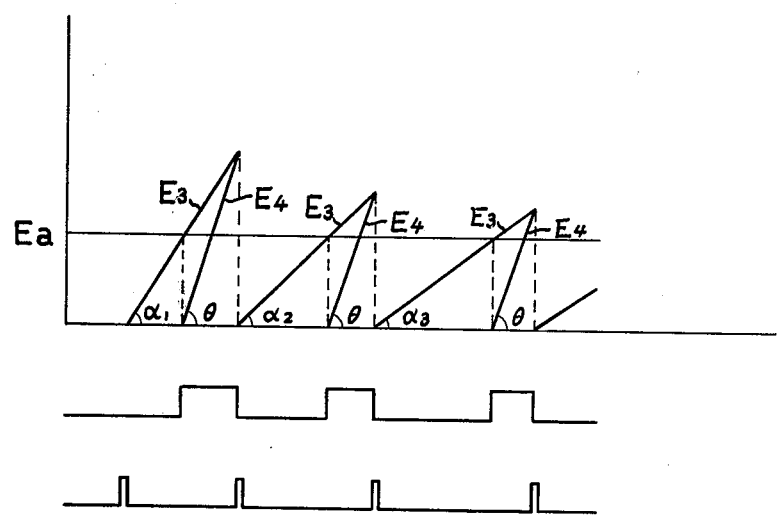
FIG. 4 is a time chart showing each integral signal and replenishing time.

In the above-mentioned apparatus, as shown in FIG. 4, when integral signal (E3) of the blackness area of the film reaches a predetermined voltage (Ea), replenishing signal (E4) appears to start a replenishing operation, and thereafter at the time when signal (E4) reaches signal (E3) such replenishing operation is stopped.

In the above-mentioned developing apparatus, according to the subject invention, a free terminal of a grounded condenser (C4) is connected with both the input and output sides of differential amplifier (5B) and thereby a leakage by-pass (21) is formed. Leakage by-pass (21) is provided with a contact (22) which is closed at a time when light source (7) is turned off. Capacitance of condenser (C4) is set to be allowable for an output ($\Delta E$) which is issued from differential amplifier (5B) at a time when light source (7) is turned off.

Figure 2:
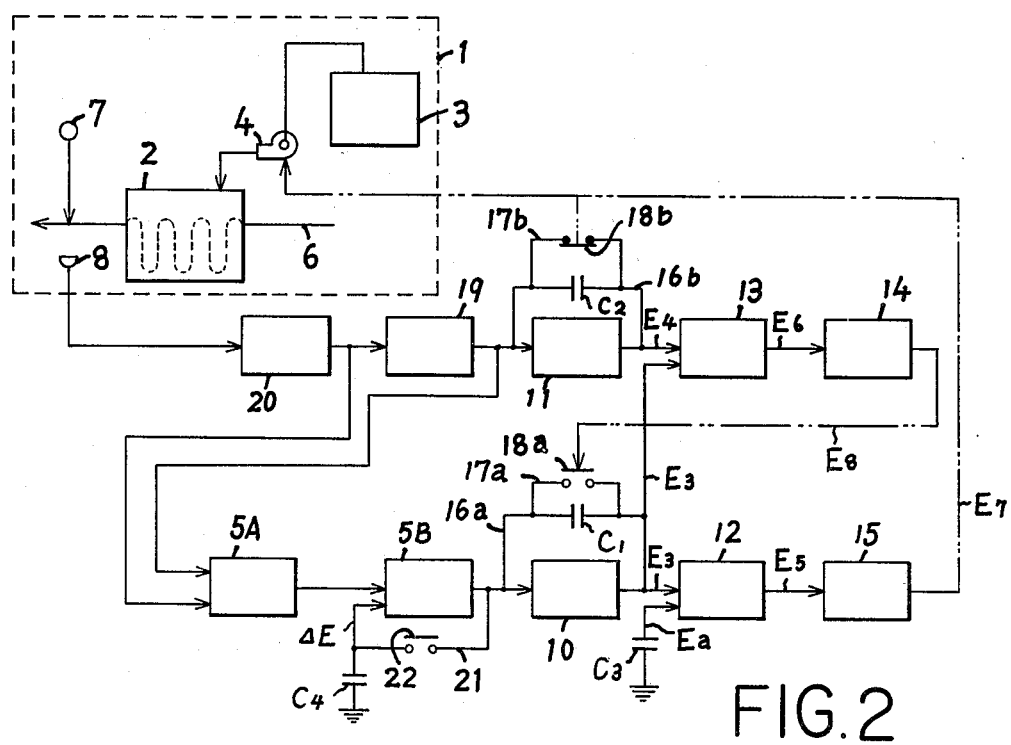
FIG. 2 is a block diagram of another embodiment of the present invention.

FIG. 2 shows another embodiment using a peak-level follower (19) instead of photocell (9) of the embodiment shown in FIG. 1. The remains of the embodiment shown in FIG. 2 are the same as the embodiment shown in FIG. 1 except a current-voltage converter (20).

Figure 3:
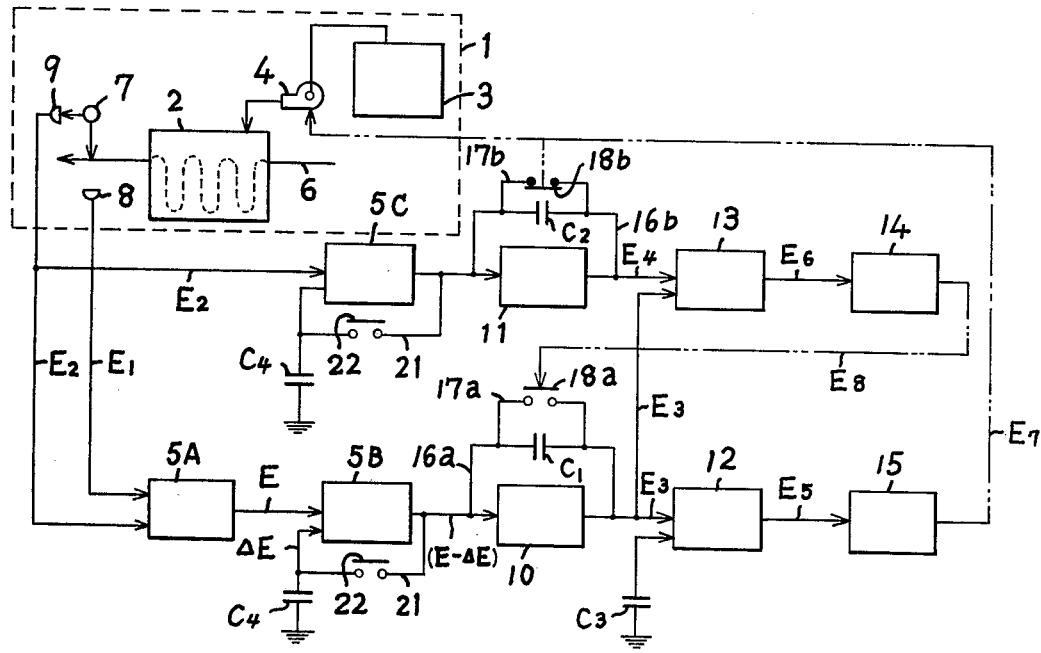
FIG. 3 is a block diagram of an additional embodiment of that of FIG. 1.

FIG. 3 shows another embodiment adding a differential amplifier (5C) in front of the second integrator shown in FIG. 1 and connecting such amplifier (5C) with a leakage by-pass in parallel. The remains of this embodiment are the same as the embodiment shown in FIG. 1.

Incidentally, means for closing contact (22) at a time when light source (7) is turned off belongs to a conventional art, therefore the explanation thereof will be neglected.

As mentioned above, in the subject embodiment, differential amplifier (5B) is provided in front of integrator and leakage by-pass (21) having condenser (C4) and a leakage contact (22) is connected with such differential amplifier (5B) in parallel. In case light source (7) is turned off, leakage contact is closed and output ($\Delta E$), which is issued as a noise from photocells (8) and (9) resulted from their temperature-characteristic and is amplified through differential amplifier (5B), is charged in condenser (C4) through leakage by-pass. This causes input of integrator (10) to set always zero at a time when light source is turned off.

When light source is turned on for detecting the blackness of the film, contact (22) of the leakage by-pass is opened and thereby voltage ($\Delta E$) is applied to differential amplifier (5B). Then, differential amplifier (5B) issues a signal (E−$\Delta E$) to the first integrator (10). Integrator (10) calculates the equation: $\int (E-\Delta E) \cdot dt$ and thereby issues a resulting signal (E3).

Therefore, voltage ($\Delta E$) issued in case light source (7) is turned off is not mixed in the value of such resulting signal (E3), which corresponds to the summing up value of the blackness of the film and shows precisely the degree of fatigue of the film developing liquid.

Therefore, in accordance with the subject invention, the degree of fatigue of the developing liquid can be detected within allowable tolerance without affected by the temperature-characteristic of photocell and thereby the replenishing operation of developing liquid can be done in proper timing.

What is claimed is:

1. A noise rejecting compensation circuit for developing apparatus comprising:
    (a) a first photo element 8 to convert a light radiated from a light source 7 after interferring in a developed film into an electrical value E1 and a second photo element 9 to convert a light radiated directly from said light source 7 into an electrical value E2;
    (b) a first differential amplifier 5A to receive said signals E1, E2 from both of said photo elements 8, 9 and to generate an amplified signal indicating the difference between said signals;
    (c) a second amplifier 5B to receive a signal from said first differential amplifier 5A;
    (d) a first integrator 10 to receive a signal from said second amplifier 5B and a second integrator 11 to receive a signal E2 from said second photo element 9;
    (e) a by-pass 16a installed in a manner to step over said first integrator and having a condenser C1; and a normally opened contact 18a installed in a by-pass 17a in a manner to step over said condenser C1;
    (f) a by-pass 16b installed in a manner to step over said second integrator and having a condenser C2; and a normally closed contact 18b installed in a by-pass 17b in a manner to step over said condenser C2;
    (g) a first comparator 12 designed to receive a signal E3 from said first integrator and a basis signal Ea and to generate a signal E5 for initiating replenishment of developer when said signal E3 reaches the same level of said basic signal Ea;
    (h) a replenishment drive circuit 15 designed to be driven by said signal E5 for initiating replenishment of developer and to actuate a developer replenishment pump 4 and further to break said normally closed contact 18b of said second integrator;
    (i) a second comparator 13 designed to receive said signal from said first integrator and said signal from said second integrator and to generate a signal E6 for ceasing replenishment of developer when both of said signals reach the same level;
    (j) a mono-multi circuit 14 to be driven by said signal E6 for ceasing replenishment of developer and to make said normally opened contact 18a of said first integrator; and
    (k) a leak circuit wherein one end of a grounded condenser C4 is connected to the input side of said second differential amplifier of which the output side is connected to a by-pass 21 having a contact 22 designed to be closed when the light source is turned off.

2. A noise rejecting compensation circuit for developing apparatus as claimed in claim 1 wherein said first differential amplifier is designed to receive a converted signal of an electrical value corresponding to a light radiated from a light source passing through a developed film.

3. A noise rejecting compensation circuit for developing apparatus as claimed in claim 1 wherein said first differential amplifier is designed to receive a converted signal of an electrical value corresponding to a light reflected from a developed film facing a light source.

4. A noise rejecting compensation circuit for developing apparatus comprising:
    (a) a converter to convert an electric current being a current converted by a photo element and corresponding to a light radiating from a light source after interferring in a developed film, into a voltage;
    (b) a peak-level follower to receive an output voltage from said converter;

(c) a first differential amplifier to receive signals from said converter as well as said peak-level follower and to generate an amplified signal indicating the difference between said signals received;

(d) a second amplifier to receive a signal from said first differential amplifier;

(e) a first integrator to receive said amplified signal from said second differential amplifier;

(f) a second integrator to receive a signal from said peak-level follower;

(g) a first comparator to receive a prescribed electrical value signal as well as a signal from said first integrator and to generate a signal for initiating replenishment of developer when said signal from said first integrator reaches the said prescribed electrical value;

(h) a drive circuit to be driven on being given said signal for initiating replenishment of developer and to actuate a developer replenishment pump and further to cause said second integrator to start an operation;

(i) a second comparator to generate a signal for ceasing replenishment of developer when it receives said signal from said second integrator as well as said signal from said first integrator and when the former signal value becomes equal to the latter signal value;

(j) a mono-multi-circuit designed to be driven by said signal from said second comparator to generate a shot pulse, thereby to cause the operation of said first integrator to be ceased; and (k) a leak circuit wherein one end of a grounded condenser is connected to the input side of said second differential amplifier of which the output side is connected to a by-pass having a contact designed to be closed when the light source is turned off.

* * * * *